UNITED STATES PATENT OFFICE.

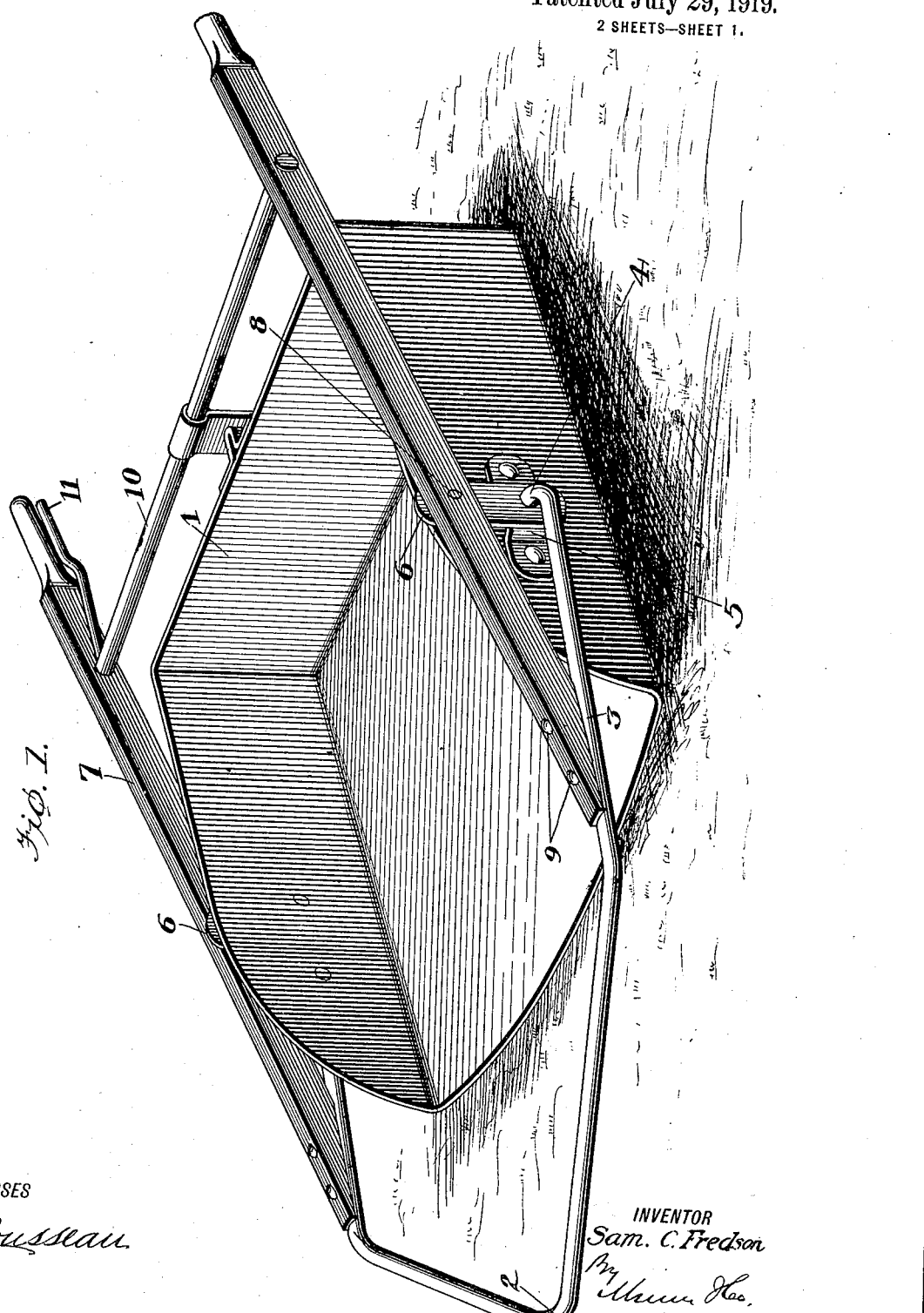

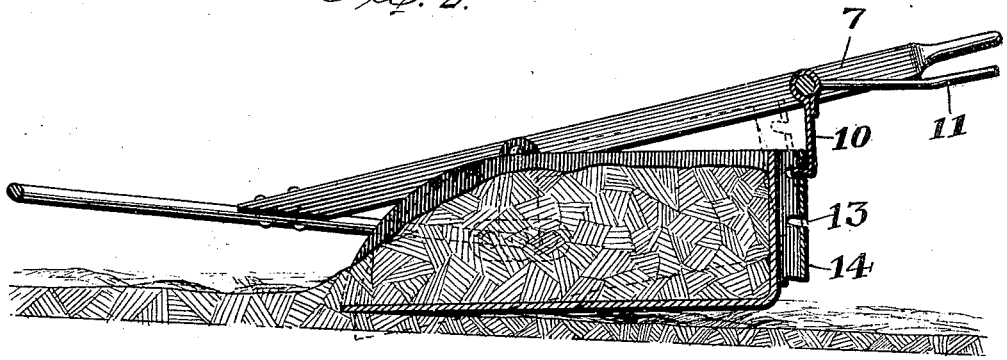
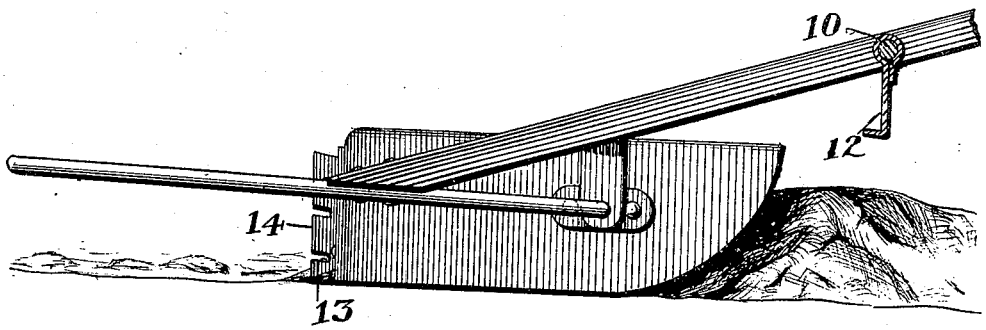
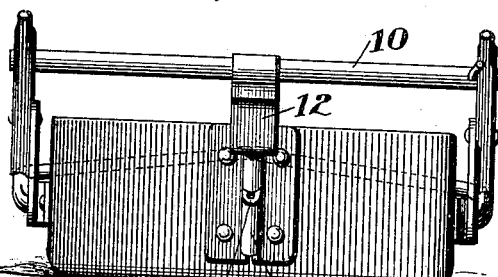

SAMUEL C. FREDSON, OF SAVANNAH, GEORGIA.

SCRAPER.

1,311,338. Specification of Letters Patent. Patented July 29, 1919.

Application filed January 31, 1919. Serial No. 274,261.

*To all whom it may concern:*

Be it known that I, SAMUEL C. FREDSON, a citizen of the United States, and a resident of Savannah, in the county of Chatham and State of Georgia, have invented certain new and useful Improvements in Scrapers, of which the following is a specification.

My invention is an improvement in scrapers, and has for its object to provide a device of the character specified wherein the bail, body and handles are so connected that the body may be dumped by traction on the bail and wherein the handles are provided with means for holding the scraper in loading position.

In the drawings:

Figure 1 is a perspective view of the improved scraper;

Fig. 2 is a longitudinal vertical section showing the scraper in loaded position;

Fig. 3 is a side view showing the scraper dumped and in position to be reversed to normal position;

Fig. 4 is a rear view.

In the present embodiment of the invention, the scraper body 1 is of usual construction, consisting of a bottom, side walls and one end wall, the other end wall being open, and the bottom being sharpened at the said end to provide a cutting edge. A bail, consisting of a body 2 and arms 3, is connected with the scraper, each arm of the bail having an inwardly extending lug 4 which is journaled in an ear 5 secured to the side wall of the body, a little nearer the cutting edge than the opposite wall.

A plate 6 is rigidly secured to each of the lugs 4 of the bail, and the said plates extend upwardly as shown. A handle 7 of wood or the like is connected to the upper end of each plate 6, as indicated at 8, and the forward end of each handle is rigidly secured to the adjacent arm of the bail, as indicated at 9. The rear end of each handle has a grip as shown, and the handles are connected just in rear of the scraper body by a shaft 10.

A latch lever 11 is secured to this shaft near the right end, and the lever extends beneath the grip of the right handle as shown, in convenient position to be engaged by the driver to oscillate the shaft 10. A latch plate 12 is rigid with the said shaft, the plate depending from the shaft and having an angular portion which is adapted to engage notches 13 in a catch plate 14 secured to the rear of the body near the center thereof. As shown in Fig. 4, this catch is formed from a sheet of metal bent to shape and secured to the rear wall of the scraper.

In operation, in filling the scraper, the parts occupy the position of Fig. 2, with the latch plate 10 engaging the topmost notch of the catch plate. When now the draft animals draw the scraper along, the traction on the bail tends to throw the front end or cutting edge of the scraper down to lift the rear ends of the handles, placing the scraper body in position to cut.

The provision of two notches in the catch plates provides for laying deep or heavy. In loose light soil the first notch is engaged by the latch plate, while for hard soil or deeper cuts the second notch is engaged.

To dump the scraper, the latch plate is engaged with the bottom of the catch plate. This raises the front of the bail higher, and increases the tendency to tip the load.

I claim:

A scraper comprising a scoop, a bail pivoted to the scoop at the opposite sides thereof nearer the cutting edge than the other edge, handles rigidly secured at their forward ends to said bail and extending rearwardly along the sides of and beyond the rear wall of the scoop, a shaft journaled in the handles transversely thereof above and to the rear of the rear wall of the scoop, a latch secured centrally upon said shaft and having its lower end extending angularly forwardly, a member secured centrally upon the rear wall of the scoop and provided with a plurality of notches selectively engageable by said latch whereby to hold the scraper with its bottom substantially horizontal whereby the scraper may ride free or to lift the rear end of the scraper to cause the cutting edge thereof to engage the ground and trip the scraper, and an arm secured to said shaft adjacent to and extending along one of said handles whereby to effect movement of said shaft and latch.

SAMUEL C. FREDSON.

Witnesses:
E. CARMEL MURPHY,
F. W. WILLIAMS.

Copies of this patent may be obtained for five cents each, by addressing the "Commissioner of Patents, Washington, D. C."